(12) United States Patent
Weir et al.

(10) Patent No.: US 7,258,785 B2
(45) Date of Patent: Aug. 21, 2007

(54) APPARATUS FOR SEPARATING OIL AND DEBRIS FROM WATER RUN-OFF

(76) Inventors: Robert K. Weir, 2390 Forest St., Denver, CO (US) 80207; Steve E. Esmond, 17 Evenson, Irvine, CA (US) 92601; Larry Quinn, 18612 Saugus Ave., Santa Ana, CA (US) 92705

( * ) Notice: Subject to any disclaimer, the term of this patent is extended or adjusted under 35 U.S.C. 154(b) by 85 days.

(21) Appl. No.: 10/681,672

(22) Filed: Oct. 7, 2003

(65) Prior Publication Data
US 2005/0072738 A1   Apr. 7, 2005

(51) Int. Cl.
*C02F 9/02*   (2006.01)

(52) U.S. Cl. .................... 210/163; 210/266; 210/282

(58) Field of Classification Search ............... 210/669, 210/691, 693, 747, 799, 806, 163, 170, 242.4, 210/259, 266, 282, 499, 924
See application file for complete search history.

(56) References Cited

U.S. PATENT DOCUMENTS

| | | | |
|---|---|---|---|
| 3,630,379 A | 12/1971 | Sharples | 210/369 |
| 3,645,400 A | 2/1972 | Floyd | 210/108 |
| 3,945,920 A | 3/1976 | Paszye et al. | 210/801 |
| 3,972,814 A | 8/1976 | Paszye et al. | 210/801 |
| 4,130,489 A * | 12/1978 | Black | 210/242.4 |
| 4,671,877 A | 6/1987 | Godbeer | 210/409 |
| 5,304,311 A | 4/1994 | Codiglia | 210/693 |
| 5,476,588 A * | 12/1995 | Nagaoka | 210/499 |
| 5,593,584 A | 1/1997 | Nurse, Jr. | 210/346 |
| 5,653,880 A | 8/1997 | Mouton | 210/300 |
| 5,791,291 A | 8/1998 | Strong et al. | 119/219 |
| 5,820,762 A | 10/1998 | Bamer et al. | 210/661 |
| 6,080,307 A | 6/2000 | Morris et al. | 210/163 |
| 6,106,707 A * | 8/2000 | Morris et al. | 210/163 |
| 6,113,778 A | 9/2000 | Kemp et al. | 210/85 |
| 6,200,484 B1 | 3/2001 | McInnis | 210/693 |
| 6,287,459 B1 | 9/2001 | Williamson | 210/99 |
| 6,315,897 B1 | 11/2001 | Maxwell | 210/170 |
| 6,350,374 B1 | 2/2002 | Stever et al. | 210/170 |
| 6,361,248 B1 | 3/2002 | Maestro | 405/49 |
| 6,497,816 B2 | 12/2002 | Naddy | 210/162 |
| 2004/0226869 A1 * | 11/2004 | McClure et al. | 210/163 |

OTHER PUBLICATIONS

Hydraulic Performance of Coanda-Effect Screens (Whal, Tonly L.) Hydraulic Engineering, vol. 127, No. 6, Jun. 2001.

* cited by examiner

*Primary Examiner*—Ivars C. Cintins
(74) *Attorney, Agent, or Firm*—John E. Reilly; Ellen Reilly; The Reilly Intellectual Property Law Firm, P.C.

(57) ABSTRACT

A method and apparatus for separating oil and debris from urban water run-off, the apparatus being made up of a chamber which is mounted in a storm drain system and has an inner basin with a tilted wire wedge wire screen filter in the path of flow of the run-off, an organic absorber floats on the water as it is collected in the basin, and a discharge plate has a series of slots which are sized to regulate the flow rate of discharge of the water from the basin for removal through an outlet at the lower end of the chamber. The method and apparatus are conformable for use with existing storm drain systems along curbs or gutters as well as parking lots, runways and the like.

20 Claims, 3 Drawing Sheets

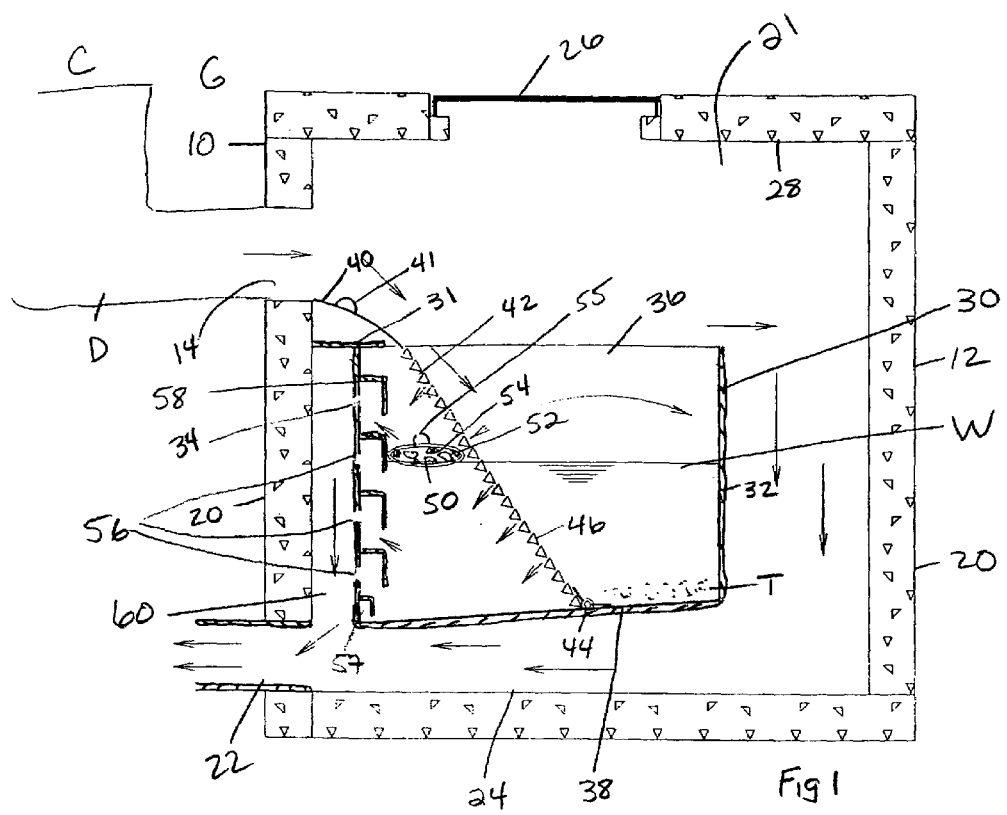
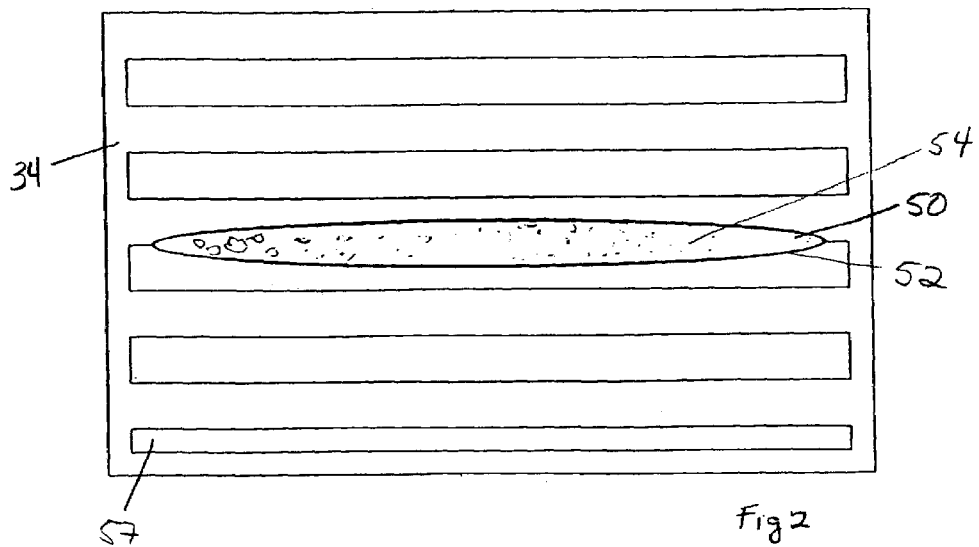
Fig 1
Fig 2

APPARATUS FOR SEPARATING OIL AND DEBRIS FROM WATER RUN-OFF

BACKGROUND AND FIELD OF INVENTION

This invention relates to a method and apparatus for filtering trash and organic materials; and more particularly relates to a novel and improved method and apparatus for separating oil and debris from urban run-off.

Environmental pollution has become a serious problem for all cities and towns across the country. Urban run-off containing debris and organic oils and other hydrocarbon materials are washing into rivers, bays and estuaries adjacent to the cities and towns. To date there has been little effort to contain this pollution. Recent Federal Regulations have begun to address the problem but, to date, the technology is not adequate. Further, a number of partially effective devices have been developed to catch debris and capture the floating oils to prevent them from moving out of containment and down to the discharge point, representative of such devices being set forth and described in U.S. Pat. No. 6,497,816 to W. Naddy, U.S. Pat. No. 6,361,248 to R. M. Maestro, U.S. Pat. No. 6,350,374 to R. R. Stever et al, U.S. Pat. No. 6,325,897 to K. Maxwell, U.S. Pat. No. 6,287,459 to J. K. Williamson, U.S. Pat. No. 6,200,484 to S. J. McInnis, U.S. Pat. No. 6,080,307 to J. F. Morris et al, U.S. Pat. No. 5,820,761 to J. M. Bamer et al, U.S. Pat. No. 5,653,880 to P. C. Mouton, U.S. Pat. No. 5,593,584, H. L. Nurse, Jr., U.S. Pat. No. 4,671,877 to B. C. Godbeer, U.S. Pat. No. 3,972,814 to A. Paszye et al, U.S. Pat. No. 3,945,920 to A. Paszye et al and U.S. Pat. No. 3,630,379 to T. D. Sharples.

Of the containment systems presently in use, drainage surfaces adjacent to roads or parking lots are employed to capture storm run-off but are not very effective for containment of the run-off for organic removal. The technique of containment and absorption for organic material is flawed, also, due to the design of the water exit flow plate, since some oils flow through the holes in the plate and into the water course. In addition, the standing water in a pond is a serious problem and provides a breeding ground for mosquitoes including those which may be infected by the West Nile virus. Accordingly, there is a serious need for a containment system capable of completely separating the organic oils from the debris in urban run-off and in such a way that the separation can be carried out efficiently while avoiding standing water for any length of time, requires a minimum number of moving parts, and is readily conformable for use in existing drainage systems, such as, for example, storm drain systems presently in use.

SUMMARY OF THE INVENTION

Among other objects and advantages of the present invention, it is an object to provide for a novel and improved method and apparatus for filtering debris and organic oils from water run-off.

It is another object of the present invention to provide an apparatus of the type described for a novel and improved method and means for absorbing hydrocarbon materials from water run-off.

It is a further object of the present invention to provide for a novel and improved drain for efficiently removing debris and organic oils which can be retrofit to existing drain systems and facilitates clean out of solid debris collected in the chamber as well as replacement of the organic oil absorber material.

In accordance with the present invention, apparatus is provided for separating oil and debris from water run-off comprising a chamber or vault disposed in the path of the run-off having an upper inlet which is in the path of flow of the run-off, a downwardly inclined wedge wire screen extending from the inlet for advancement of the run-off thereacross, a basin including debris-collecting means for collection of solid materials at the lower end of the screen, an organic absorber disposed in the path of run-off passing through the screen for the absorption of organic oils in the run-off, an outlet at a lower end of the chamber, and discharge means for removal of run-off after it has passed through the organic absorber.

The organic oil absorber is in the form of a buoyant pillow or pad which will float on top of the water that accumulates in the basin, and the optimum rate of flow of water through the basin is regulated by a series of vertically spaced, horizontally extending discharge orifices. Although the organic oil absorber is located beneath the screen, the screen is preferably hinged at the bottom so that it will open up to permit access to the pillow and permit ease of replacement of the pillow once it has become saturated with the organic oils. I have previously devised a Coanda effect screen characterized by having tilted wires to achieve highly efficient debris and particulate filtration. The current invention has been found to be particularly effective in the separation of organic oils from the water and debris without impeding the flow of run-off, reference being made to my copending application for patent Ser. No. 10/430,858, filed 5 May, 2003 entitled APPARATUS AND METHOD OF PARTICULATE REMOVAL FROM LIQUIDS, and incorporated by reference herein.

The above and other objects, advantages and features of the present invention will become more readily appreciated and understood from a consideration of the following detailed description of preferred and modified forms of the present invention when taken together with the accompanying drawings in which:

BRIEF DESCRIPTION OF THE DRAWINGS

FIG. 1 is a somewhat schematic view shown partially in section of a first form of separation system in accordance with the present invention;

FIG. 2 is an elevational view of the discharge plate in one sidewall of the screen box;

DETAILED DESCRIPTION

Figure 3:
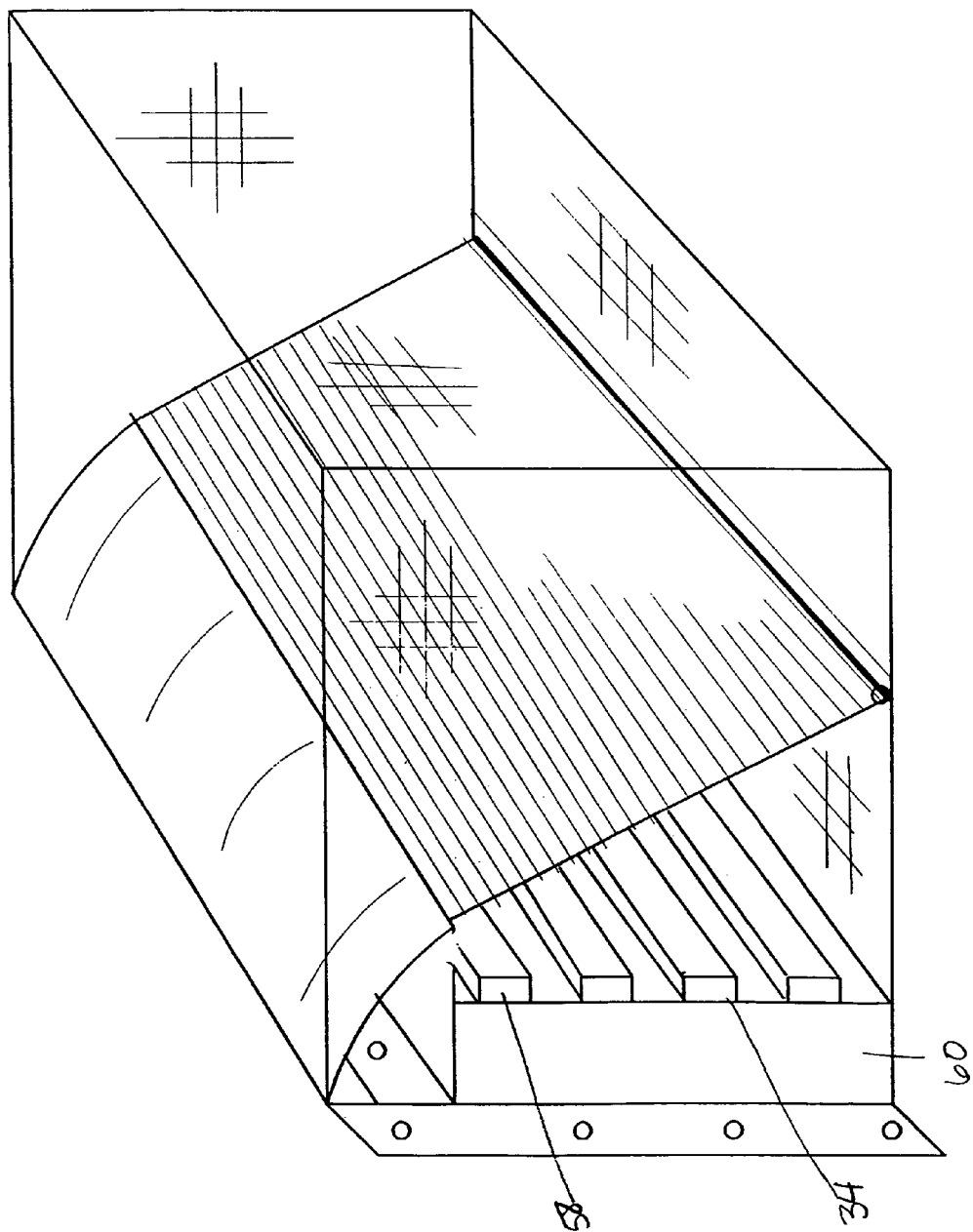
FIG. 3 is a front elevational view partially in section of the arrangement of the filtration screen and acceleration plate in relation to a storm drain.

Referring in more detail to the drawings, there is shown by way of illustrative example in FIGS. 1 to 3 a separator apparatus 10 for separating debris and organic oils from water, such as, for example, urban run-off flowing along a gutter G between a curb C and either side of a street and having storm drains located at spaced intervals in the curb C which flanks one side of the gutter and is slightly raised with respect to the gutter. The apparatus 10 of the present invention is readily conformable for use with existing curbs and gutters by installing a chamber or vault 12 beneath the curb C such that an upper inlet 14 is aligned with the opening or drain D which is typically provided with spaced metal bars, not shown, to prevent larger debris from passing into the drain system.

The chamber 12 is made up of vertical side and end walls 20 and 21, one of the side walls 20 including the inlet 14 and a lower outlet 22. An upper flat, removable manhole cover 26 is positioned in a top wall 28 to permit access to the interior of the chamber 12 for cleaning purposes in a manner to be described.

A basin 30 is suspended within the chamber 12 by a suitable bracket 31 which is anchored to the sidewall 20. The basin 30 is made up of a basin end wall 32, a discharge plate 34 opposite to the end wall 32 and opposite side walls 36 along with a bottom wall 38 which slopes downwardly from the end wall 32 to the lower end of the discharge plate 34 and is spaced above a bottom wall or floor 24 of the chamber. An acceleration plate 40 of bowed or arcuate configuration and having a lift handle 41 slopes downwardly from the lower edge of the inlet 14 over the bracket 31 into abutting relation to the upper end of a tilted wire wedge wire screen 42. The screen 42 inclines downwardly inside of the basin 30 to terminate in a lower edge which is hinged as at 44 to the bottom wall or floor 38 of the basin 30. The tilted wire wedge wire screen 42 has horizontally extending, vertically spaced, tilted wires 46 as illustrated in FIG. 1 traversing the entire width of the basin 30 between the opposite side walls 36. The drain water run-off flows downwardly over the acceleration plate 40 and along the screen 42 to filter out any debris which collects as represented at T at the foot or base of the screen and along the floor surface 38.

As best seen from FIGS. 1, 2 and 3, the discharge plate 34 is of generally rectangular configuration having a series of vertically spaced horizontally extending slots 56 substantially traversing the width of the plate. A hood or baffle 58 is disposed in overhanging relation to each of the slots 56 so that the water is forced to flow upwardly around the lower open end of each baffle 58 and out through the slot 56 to flow downwardly through the channel or space 60 between the discharge plate 56 and sidewall 20. The baffle 58 also acts to prevent organic oil on the surface of the run-off from passing through the slot 56. The slots 56 are uniform in length and width with the exception of lower slot 57 which is narrower in length and width. This is to permit the filtered water to be discharged downwardly toward the outlet 22 with a minimum of residual water left in the bottom of the chamber or vault 12.

The water together with any organic oils are free to pass through the screen 42 and accumulate as represented at W in the basin. Any organic oils will float on the top surface of the water and an organic absorber pillow 50 is comprised of an outer mesh-like or porous container or bag 52 filled with a hydrophobic material 54 which is typically used in oil spills to absorb oil. The absorber 50 is also provided with one or more lift handles 55 to permit replacement by pivoting the screen 42 laterally about the hinge 44 by grasping the handle 41 on the acceleration plate 40. The manhole cover 26 permits easy access to the lift handle 55 on the absorber 50. Also, the manhole cover 26 can be lifted to permit insertion of a suction device to remove the trash or debris T on the floor 38 of the basin 30. The density of the pillow 50 is controlled to be buoyant and float on the top surface of the water W where the organic oils will tend to collect; also, the pillow 50 is of a width to substantially traverse the width of the discharge plate 34 so as to be in the path of flow of the water through the discharge plate in a manner now to be described.

In the event that the water level should increase more rapidly than it can be discharged through the slots 56, the basin end wall 32 serves as an overflow pier so as to prevent water from backing up through the inlet and to escape over the pier in the direction of the arrows and downwardly for removal through the outlet 22 and back to the system. It will be apparent that the specific spacing and inclination of the screen 42 away from the discharge plate 34 may be varied according to the space required for the absorber 50 to be freely movable up and down with the water level. Similarly, dimensioning of the slots 56 can be regulated according to the flow rate or the capacity of water run-off encountered.

ALTERNATE FORMS OF INVENTION

Figure 4:
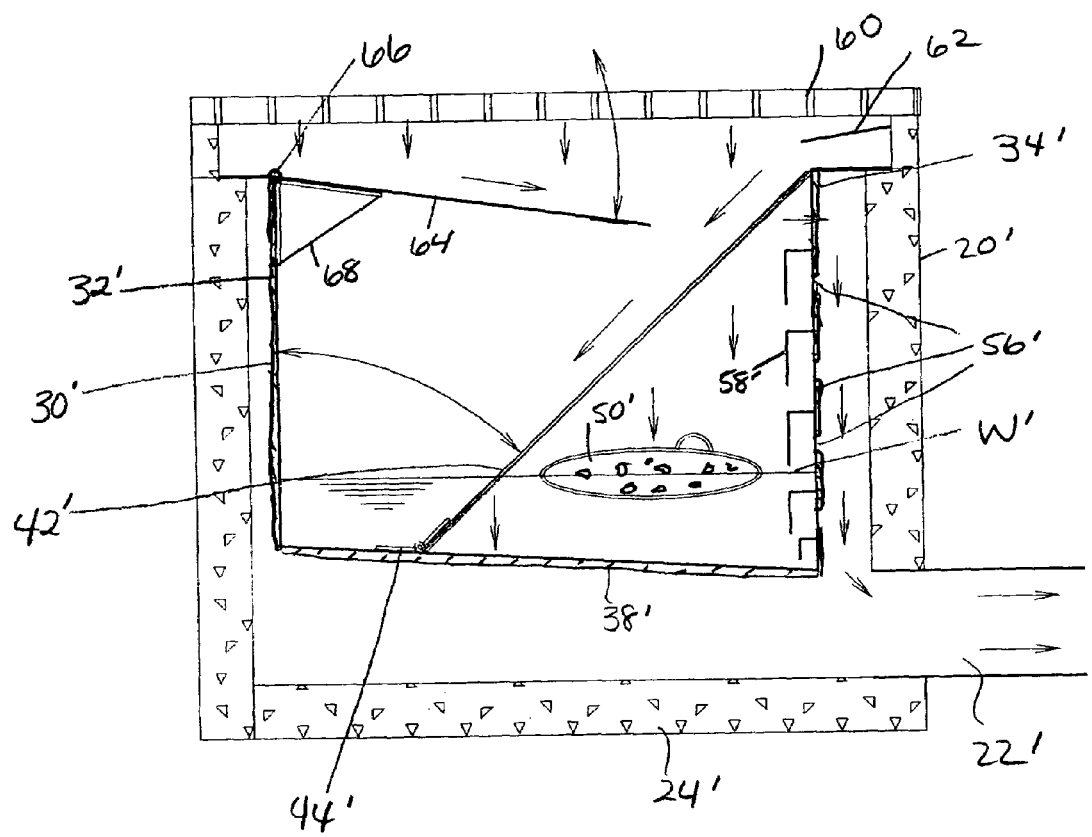
FIG. 4 is a somewhat schematic view partially in section of another embodiment of the separation system adapted for use in a parking lot.

An alternate form of invention is illustrated in FIG. 4 in which like parts are correspondingly enumerated to those of FIGS. 1 to 3. The alternate form of invention is designed primarily for use in connection with a drainage surface or parking lot and, in place of a solid top wall 28 with manhole cover 26 of the form of FIGS. 1 to 3, utilizes a grate 60 at a low point in the surface of the parking lot. The basin 30' is modified to eliminate the acceleration plate of the first form and to extend the tilted wire wedge wire screen 42' directly from the upper end of the discharge plate 34' to the lower hinged end 44' on the floor 38' of the basin 30'. A baffle 62 is positioned above the discharge plate 34' and inclined downwardly toward the screen 42' to deflect the water run-off and cause it to flow by gravity downwardly along the screen 42'. In addition, a main baffle plate 64 is hinged as at 66 to an end wall 32' and is capable of pivoting upwardly and downwardly through a controlled angle to direct the flow rate of water passing through the grate 60 and the water level W' in the basin 30'. The baffle 64 is supported by a bracket support 68 which prevents the baffle 64 from coming into contact with the screen 42'. As in the first form, the absorber pillow 50' is buoyant and free to follow the water level so as to intercept any organic oils on the surface of the water before the oils come into contact with baffles 58' which further prevent the oils from escaping through the discharge slots 56'.

It will be evident that the slots 56' may extend continuously across the discharge plate 34 so that the passage of water is restricted by the size of each slot 56'. This sometimes results in the overtopping of the screen 42' and discharge plate 34'. However, this problem is overcome by the sizing of the slots 56'. The entire process can be accelerated by increasing the size of the slots 56' in the plate 34' from the lower end to the upper end of the plate 34'. This configuration will pass more water depending upon the flow and level of water in the device thereby reducing the size and cost of the device and outlet structure, since the more rapidly the device can be emptied the more effective the process will become.

When used in association with parking lot run-off, the device is designed to be of sufficient volume to capture the expected run-off from the impervious surfaces. The device may also be placed in a swale which may then be planted with broad-leaved grass and plants to catch the floating organic oils and solvents. It must also be capable of capturing debris and passing water without becoming plugged and, to this end, the system of FIG. 4 is most desirably located at a low center of a slightly sloped parking lot. Gravity will draw the run-off to pass through the grate 60 and into the basin 30'.

It is therefore to be understood that while preferred forms of invention are herein set forth and described, the above and other modifications may be made therein without departing from the spirit and scope of the invention as defined by the appended claims and reasonable equivalents thereof.

We claim:

1. Apparatus for separating oil and debris from water run-off comprising:
    a chamber having an upper inlet, said inlet being in the path of flow of the runoff;
    a downwardly inclined, wedge wire screen in said chamber extending from said inlet for advancement of the run-off thereacross;
    a basin including debris-collecting means at a lower end of said screen, said screen inclining downwardly through said basin and terminating in a lower edge hingedly connected to a bottom wall of said basin;
    a buoyant organic absorber pillow disposed behind said screen in the path of run-off passing through said screen for the absorption of organic oils in the run-off;
    an outlet at a lower end of said chamber; and
    discharge means for removal of runoff after it has passed through said organic absorber pillow.

2. Apparatus according to claim 1 wherein said basin is suspended within said chamber and includes an outer surrounding vertical wall including means terminating in said upper end of said screen to control overflow of run-off from said basin into said chamber.

3. Apparatus according to claim 1 wherein said discharge means is mounted within said basin and includes a series of vertically spaced discharge orifices and overhanging baffles.

4. Apparatus according to claim 3 wherein said discharge orifices are narrowed at a bottom end of said basin.

5. Apparatus according to claim 1 wherein said chamber includes upper removable cover means for selective evacuation of debris collected in said basin.

6. Apparatus according to claim 1 wherein said chamber has a lower sloped bottom panel and said outlet having a lower end flush with said bottom panel.

7. Apparatus according to claim 1 wherein said wedge wire screen includes tilted wire wedge wire.

8. In apparatus for separating oil and debris from water run-off from a storm drain:
    a chamber disposed in the path of flow of the run-off having an upper inlet;
    a downwardly inclined wedge wire screen in said chamber extending from said upper inlet for advancement of the run-off thereacross;
    a basin including debris-collecting means at a lower end of said screen, said screen inclining downwardly through said basin;
    a buoyant organic absorber pillow floating on the run-off in said basin;
    an outlet at a lower end of said chamber; and
    discharge means for removal of run-off after it has passed through said organic absorber pillow, said discharge means disposed in a side wall of said basin.

9. Apparatus according to claim 8 wherein said organic absorber pillow is disposed behind said screen.

10. Apparatus according to claim 8 wherein said basin is suspended within said chamber and includes an outer surrounding vertical wall to control overflow of run-off from said basin into said chamber.

11. Apparatus according to claim 8 wherein said discharge means is mounted within said basin and includes a vertical plate having a series of vertically spaced discharge orifices.

12. Apparatus according to claim 11 wherein said discharge orifices are reduced in size at a lower end of said discharge means.

13. Apparatus according to claim 8 wherein said screen is hinged to a lower end of said basin.

14. Apparatus according to claim 8 wherein said chamber includes upper removable cover means for selective evacuation of debris collected in said basin.

15. Apparatus according to claim 8 wherein said chamber has a lower sloped bottom panel and said outlet has a lower end flush with said bottom panel.

16. In apparatus for separating organic materials and debris from water run-off comprising:
    a chamber for receiving the run-off having an upper inlet;
    a basin suspended within said chamber;
    a downwardly inclined tilted wire wedge wire screen filter in said basin beneath an upper open end of said basin and traversing a substantial length of said basin;
    said basin including debris collecting means at a lower end of said filter;
    a buoyant organic absorber pillow floating on a surface of the run-off in said basin;
    an outlet at a lower end of said chamber; and
    first discharge means in a wall of said basin for removal of the run-off after it is passed through said organic absorber and second discharge means for the removal of any excess run-off over an upper end of said basin that is not removed by said first discharge means.

17. In apparatus according to claim 16 wherein an acceleration plate is disposed at an upper end of said filter and disposed in said basin over which the run-off is advanced, and said absorber is disposed behind said filter.

18. In apparatus according to claim 17 wherein said filter includes an upper acceleration plate.

19. In apparatus according to claim 16 wherein said first discharge means includes a plurality of discharge orifices for removal of the run-off from said basin.

20. In apparatus according to claim 19 wherein said discharge orifices are disposed in vertically spaced relation to one another and baffle plates extend in overhanging relation to said orifices.

* * * * *